United States Patent
Lambert et al.

(10) Patent No.: US 9,810,573 B2
(45) Date of Patent: Nov. 7, 2017

(54) LIGHT SHIELD

(71) Applicant: Elstat Electronics Ltd., Preston (GB)

(72) Inventors: Philip Eric Lambert, Preston (GB); Anthony Francis Barcroft, Chester (GB)

(73) Assignee: ELSTAT LIMITED, Preston (GB)

( * ) Notice: Subject to any disclaimer, the term of this patent is extended or adjusted under 35 U.S.C. 154(b) by 0 days.

(21) Appl. No.: 14/932,011

(22) Filed: Nov. 4, 2015

(65) Prior Publication Data

US 2016/0123799 A1 May 5, 2016

(30) Foreign Application Priority Data

Nov. 5, 2014 (GB) .................................. 1419733.9

(51) Int. Cl.
| | |
|---|---|
| *G01J 1/02* | (2006.01) |
| *A47F 10/02* | (2006.01) |
| *G01V 8/00* | (2006.01) |
| *G08B 21/18* | (2006.01) |
| *G01V 8/12* | (2006.01) |
| *G01J 5/04* | (2006.01) |

(Continued)

(52) U.S. Cl.
CPC ............ *G01J 1/0214* (2013.01); *A47F 10/02* (2013.01); *G01V 8/00* (2013.01); *G08B 21/182* (2013.01); *A47F 2010/025* (2013.01); *G01J 1/0266* (2013.01); *G01J 3/02* (2013.01); *G01J 3/0262* (2013.01); *G01J 5/041* (2013.01); *G01V 8/10* (2013.01); *G01V 8/12* (2013.01)

(58) Field of Classification Search
CPC ............................. F25D 2500/06; G01J 1/0214
See application file for complete search history.

(56) References Cited

U.S. PATENT DOCUMENTS

| | | | |
|---|---|---|---|
| 6,259,965 B1* | 7/2001 | Steele | G07F 11/42 221/6 |
| 2005/0190072 A1 | 9/2005 | Brown et al. | |
| 2007/0069867 A1* | 3/2007 | Fleisch | G06Q 10/087 340/309.16 |

FOREIGN PATENT DOCUMENTS

| | | |
|---|---|---|
| JP | H06189842 | 7/1994 |
| JP | 2009082304 | 4/2009 |

OTHER PUBLICATIONS

EPO, European Search Report for EP3017725 (application No. EP20150193172), dated Feb. 25, 2016 [6 pgs.].

(Continued)

*Primary Examiner* — Benyam Haile
(74) *Attorney, Agent, or Firm* — Siritzky Law, PLLC

(57) ABSTRACT

Disclosed is a sensor shield for use in a multi-shelf merchandise display unit including a plurality of sensors mounted on a wall of the unit and opposite a source of illumination, in which each sensor corresponds to a single shelf and in which the shelves are at least semi-porous to the illumination. The shield comprises i) a plate having a length that is sufficient substantially to reduce or prevent incident illumination from the shelf above reaching the sensor; and ii) means to attach the plate to casing of or around the sensor or the wall of the unit. The plate is opaque to the illumination detected by the sensor. Also disclosed is a method to reduce the interference of light in a multi-shelf merchandise display unit from shelves above a shelf on which stock levels are being measured and a method for monitoring stock levels in a retail display cabinet by measuring light entering the retail display cabinet.

19 Claims, 4 Drawing Sheets

(51) Int. Cl.
   *G01V 8/10*   (2006.01)
   *G01J 3/02*   (2006.01)

(56) References Cited

OTHER PUBLICATIONS

WIPO, International Search Report for PCT/EP2015/075830, dated Feb. 25, 2016 [7 pgs.].
UK Intellectual Property Office (UKIPO), Search Report for GB Application No. GB1419733.9, dated Apr. 16, 2015 [3 pgs.].
WIPO, Written Opinion of the International Searching Authority for PCT/EP2015/075830, dated Feb. 25, 2016 [7 pgs.].
UK Intellectual Property Office, Combined Search and Examination Report for GB Application No. GB1519482.2, dated Apr. 15, 2015 [3 pgs].
UK Intellectual Property Office (UKIPO), claims amended in UK Application No. GB1519482.2, dated Feb. 16, 2016.
UK Intellectual Property Office (UKIPO), GB Application No. GB1519482.2, Applicant's letter of Feb. 16, 2016 to UKIPO in response to the Combined Search and Examination Report of Dec. 16, 2015.
UK Intellectual Property Office (UKIPO), Examination Report under Section 18(3) for GB Application No. GB1519482.2, dated Apr. 19, 2016 [2 pgs.].
UK Intellectual Property Office (UKIPO), Search Report for GB Application No. GB 1519482.2, dated Dec. 15, 2015 [1 pg.].

\* cited by examiner

LIGHT SHIELD

This application claims priority from GB 1419733.9 filed on Nov. 5, 2014, the entire contents of which are hereby fully incorporated herein by reference for all purposes.

The present invention relates to the enablement of accurate stock level prediction in an automated merchandise display cabinet such as a cooled drinks cabinet.

Glass fronted merchandise units are used throughout the world and typically comprise multiple flat or sloping shelves that both store and display items for sale. Typically, such a cabinet or unit is used for storing and dispensing items at a point of sale, through a sales clerk or other store employee, as part of a vending machine or as part of a point of sale display rack directly accessible by the customer. The cabinets or units include display and storage of almost any type of product, generally presented to the consumer in a box, carton, wrapping, bag and the like, such as cigarettes, packaged foods, drinks, over the counter medicine, sweets, perfume, novelties, and the like.

Glass fronted merchandise cabinets and units are used in a shop, such as a convenience store, for storage and dispensing goods for sale, either providing a self-service option to customers, or providing storage and display means from which a sales clerk dispenses items for sale to customers.

The propensity of consumers to purchase items from such a unit is, in part, affected by the attractiveness of the display which, in turn, is influenced by how well the unit is stocked. Put simply; if the stock levels on any particular shelf in a unit reduce to an unacceptable level, so does the attractiveness of the display to the consumer which, in turn, leads to a lower propensity to purchase by the consumer versus a unit that is fully stocked and has an attractive display.

As a result, it is in the interest of the retailer and the stock supplier to be able to measure when the stock levels are inadequate for a particular shelf so that action may be taken to re-stock and increase the consumer propensity to purchase.

The inventors have ascertained empirically that measurement of stock levels, by shelf, in a glass-fronted merchandise unit is technically feasible using light measurement. Specifically, if a constant intensity light source is mounted at the front of a shelf in a unit opposite a light detection device mounted at the rear of the shelf then the light intensity level detected will be affected by the amount of stock on the shelf as it is the stock that blocks/absorbs the light. When the stock level is high, transmission of light to the detector is significantly blocked and the light detector reading is low. Correspondingly, when the stock level is low, blocking of the light is reduced and so the light detector reading is high.

However, during the inventors' empirical studies, with light detector devices mounted at the rear of each shelf, it has been noticed that the accuracy of stock level predictions for a specific shelf are significantly affected by light from neighbouring shelves. Shelves in merchandise units are typically white or metal to highlight cleanliness and include perforations to facilitate air circulation around stock. Perforations are of particular importance in a refrigerated unit to ensure that the stock is sufficiently cooled. The problem of stray light is a particular issue where the light source is a common one that spans all shelves of a unit. It has been found that, if the stock level on the shelf above is lower than that on the shelf below, the light detector allocated to the shelf below is able to detect light reflected from the shelf above and transmitted through the perforations.

To illustrate this, consider a four-shelf glass-fronted beverage merchandise unit where Shelf 1 is the lowest shelf and Shelf 4 is the highest in the unit. The unit is illuminated with a single fluorescent tube light mounted vertically at the front of the unit, spanning and illuminating all four shelves. For the sake of illustration, identical light detection devices are mounted at the rear of each of the four shelves and, using the light level detected, predict the stock level on each separate shelf using an empirically derived formula.

Using the above illustration, the inventors have found that it is possible to predict the actual stock level of a particular shelf with suitable accuracy by measuring the light intensity detected at the rear of the shelf and comparing the reading with an empirically derived formula that correlates predicted stock level with light intensity. However, this situation only provides an accurate prediction when the stock level of the shelf above remains constant. As a result, the inventors have found that it is not possible to predict with reasonable accuracy the stock level of a particular shelf based on measured light intensity if the stock level of the shelf above that being measured varies.

The reason for the inability to predict stock levels with any degree of accuracy is because the light detected on any particular shelf is made up of the light being transmitted horizontally from the light source directly in front of that shelf, plus the light being reflected from and transmitted through the shelf above. As the light transmitted through and from the shelf above is a function of the stock level on that shelf, it will be readily appreciated that this adds a large, unpredictable component that seriously impairs accuracy.

While the prediction of stock levels using detection of light levels is attractive due to the ability to retro-fit light detectors to existing units, the lack of complicated electronics and equipment in the system as a whole and the corresponding lack of expense, there is a clear flaw in the use of such a system. The present invention seeks to overcome the problems outlined above and encompasses means that enable an accurate prediction of stock level on a specific shelf within a glass-fronted or frontless merchandise unit.

Accordingly, the present invention resides in a sensor shield for use in a multi-shelf merchandise display unit including a plurality of sensors mounted on a wall of the unit and opposite a source of illumination, in which each sensor corresponds to a single shelf and in which the shelves are at least semi-porous to the illumination, the shield comprising:
  a plate having a length that is sufficient substantially to reduce or prevent incident illumination from the shelf above reaching the sensor; and
  means to attach the plate to casing of or around the sensor or the wall of the unit,
wherein the plate is opaque to the illumination detected by the sensor.

It will be appreciated that the sensors are positioned at a distance above the height of a shelf to enable substantial blocking of the sensor by merchandise placed on the shelf.

Preferably, the shape or length of the plate does not significantly reduce the window through which the sensor is able to sense the illumination illuminating the shelf to which the sensor is associated. In other words, the shape or length of plate is such that the line of sight from the sensor is beyond the front edge of the shelf above.

Ideally, the plate is shaped such that it has a length that intersects a virtual line between the lowest point of the sensor when in situ and a point on the shelf above that is furthest from the sensor. In practice, a length of between about 0.5 cm and about 4 cm has been found to be sufficient to block sufficient illumination from the shelf above in a typical chilled beverage cabinet. It will be appreciated that the actual length of the plate will depend on the size of the sensor, how much the sensor protrudes into the space above the shelf and whether or not the sensor is recessed into the wall of the unit and, if so, by how much.

In a preferred embodiment, the plate is a substantially flat sheet having a rectangular or semicircular shape. The width of the plate may be of any suitable dimension from the complete width of the shelf to the width of the sensor. While the plate may include an element of curvature so that side edges are deflected downwards towards the shelf, it has been found that the any element of sides to the plate should not substantially impede the sensor's line of sight. If orthogonal or other oriented sides are included in the shield, it is preferred that such sides are not opaque to the source of illumination. In this way, there is minimal impairment of light reaching the sensor from light source along shelf axis.

In an alternative embodiment, the plate has a lip at the leading edge furthest from the attachment means, wherein the lip depends downwards towards the shelf. In an alternative arrangement, the plate may have a curved or convex shape so the leading edge of the plate depends downwards towards the shelf, optionally below the top of the sensor when in situ. The advantage of such additional shape is the length of the plate may be reduced. However, the disadvantage is the leading edge depends below the top the sensor and so reduces the window through which the sensor is able to sense the illumination illuminating the shelf to which the sensor is associated.

The plate may be made from any suitable material including metal, plastic or rubber or combination thereof.

While it will be appreciated that any source of illumination may be used, the term ideally encompasses infra red, visible and ultraviolet light typically defined as having a wavelength in the range of between 100 nm and 1000 nm.

Thus, the sensor is preferably a photosensor, ideally a unidirectional sensor receiving radiation from 360 degrees.

A photosensor is a sensor of light or other electromagnetic energy that converts light rays into electronic/electrical signals. A photoresistor, as an example of a photosensor, measures the physical quantity of light and translates it into a form read by a suitable instrument. Usually, a photosensor is part of a larger system integrating a measuring device, a source of light and the sensor itself. This is generally connected to an electrical trigger, which reacts to a change in the signal within the photosensor.

One of the features of a photosensor is its ability to measure the changes from one or more light beams. This change is most often based around alterations to the intensity of the light. When a phase change occurs, the photosensor acts as a photoelectric trigger, either increasing or decreasing the electrical output, depending on the type of sensor.

Preferably, the measuring device of the sensor either measures electrical resistance if the photosensor is a light detecting resistor (LDR) or measure voltage if the optical sensor is a light sensitive diode (LSD).

In both embodiments, the measuring device ideally has sufficient sensitivity to detect either a resistive difference or voltage difference between light levels of between zero and about 400 lumens (equivalent to the light given off by a 40 Watt light bulb).

In another aspect, the present invention resides in a method to reduce the interference of light in a multi-shelf merchandise display unit from shelves above a shelf on which stock levels are being measured in which the unit includes a plurality of sensors mounted on a wall of the unit and opposite a source of illumination, in which each sensor corresponds to a single shelf and in which the shelves are at least semi-porous to the illumination. This is achieved by providing a sensor shield comprising:

a plate having a length that is sufficient substantially to reduce or prevent incident illumination from the shelf above reaching the sensor; and means to attach the plate to casing of or around the sensor or the wall of the unit, wherein the plate is opaque to the illumination detected by the sensor.

Inclusion of a sensor shield enables a more accurate estimate of stock levels.

In particular, the invention resides in a method for monitoring stock levels in a multi-shelf merchandise display unit, the method comprising measuring illumination entering or originating from within the retail display cabinet, wherein light is measured by one or more sensors positioned on the opposite side of stock placed in the unit to the light entering or originating from within the cabinet. In other words, the light is measured by one or more sensors positioned on the opposite side of stock to light directed towards the sensor.

The one or more sensors are connected to a measuring device that triggers an alert when the stock level reaches a predetermined low level or zero because light reaching the one or more sensors has exceeded a preset value.

In a preferred embodiment, the illumination is measured by sensors positioned on or integral to a rear, side or front wall of the unit. Alternatively, the sensors are located in a corner between a rear and side wall of the unit.

When shelves in the unit are filled with product, the majority of light entering the unit (either ambient or from illumination provided at the front of the unit) is reflected back by the product and very little light reaches the unit wall on the other side of the product to the illumination. Consequently, the amount of light falling onto the sensor is very low. In this situation, the light intensity at the sensor is expected to be in the region of between about 1 and about 20 lumens. Thus, the amount of product on the shelf acts as a barrier between the light source and the sensor.

As the amount of product on the shelf reduces, less light is reflected by the product and more light reaches the unit wall on the other side of the product. Consequently, the amount of light falling onto the sensor increases. In an extreme situation, when there is no product on the shelf, the light intensity reaching the sensor may be as high as up to about 400 lumens.

By carrying out a simple calibration of the unit in a filled and empty state, the measuring device is able to determine when the unit is fully stocked and when product is low or missing.

The alert may be any suitable alert, including a visual alert such as a continuous or flashing light, an aural alert such as an audible alarm, or an electronic alert to a remote microprocessor, for example to inform a retailer that stock is low or missing, or to instruct a supplier to provide more product.

In one embodiment, the light reaching the one or more sensor may be ambient light and/or may be light from illumination provided at the front of the cabinet. Alternatively, the light may be provided at or towards the rear of the cabinet if the one or more sensors are positioned on the front wall of the cabinet.

The method may further comprise recording time data to enable a retailer or product supplier to evaluate when the multi-shelf merchandise display unit was emptied, or was running low on stock and/or when stock in the unit was replenished. Alternatively, or in addition, the method may comprise recording data by shelf to provide information on specific product sales and purchasing trends.

The present invention will now be described in detail by way of example as illustrated in the accompanying figures in which.

Figure 3:
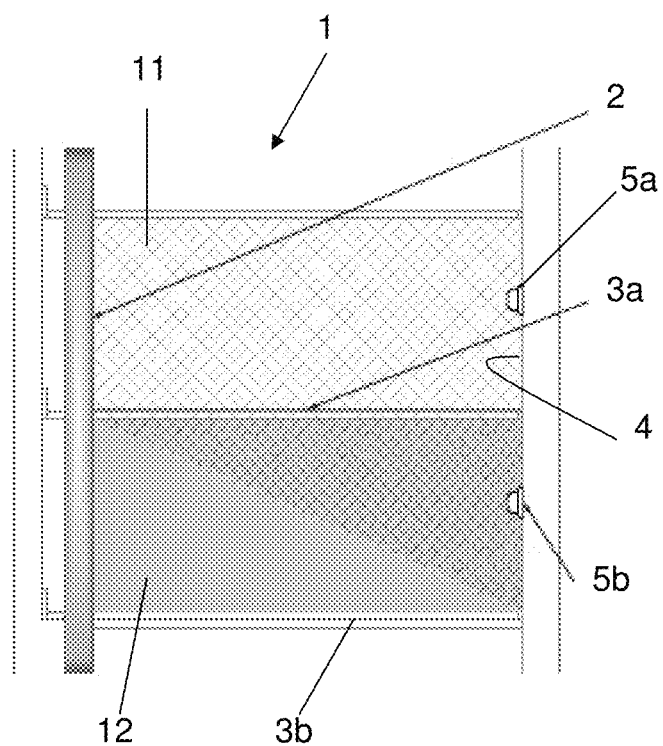
FIG. 3 shows a cross-section side view of a detail of the RBMU illustrating light flow between a pair of shelves.
Figure 4:
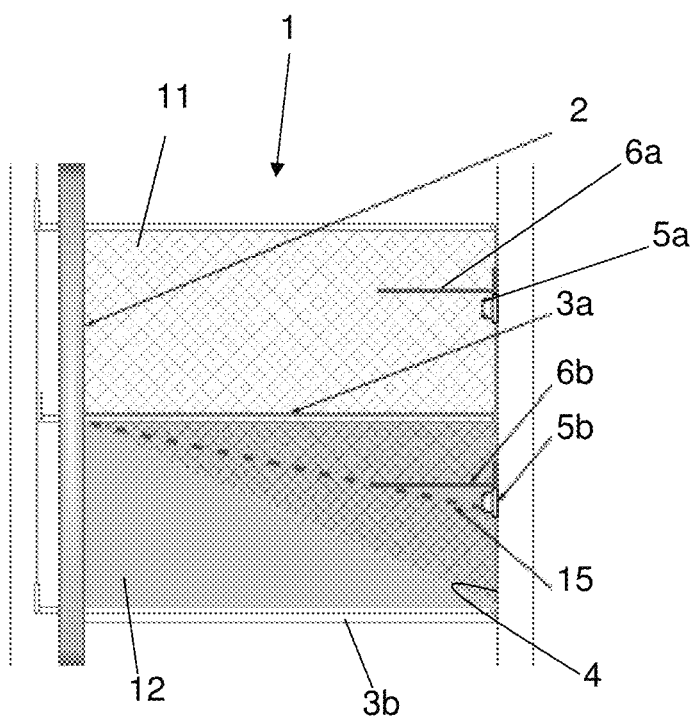
Figure 5A:
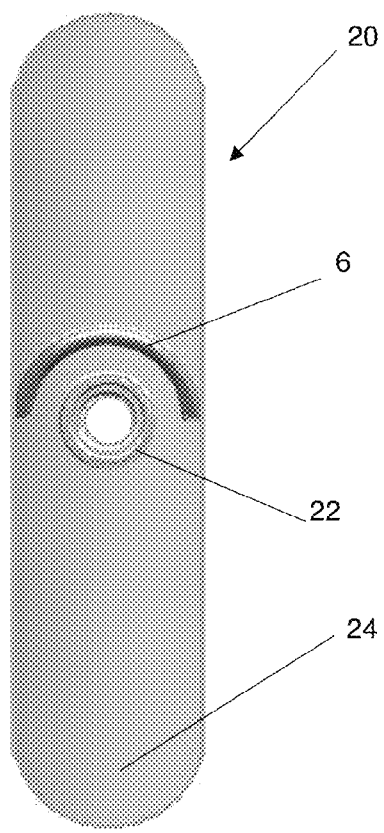
Figure 5B:
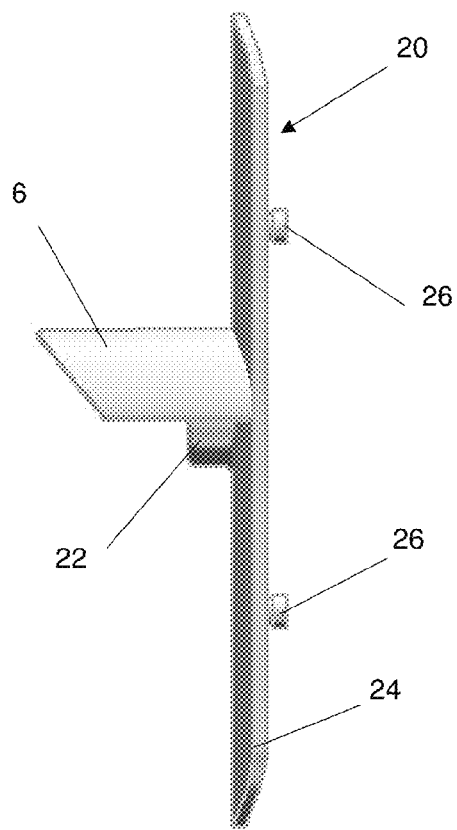
Figure 5C:
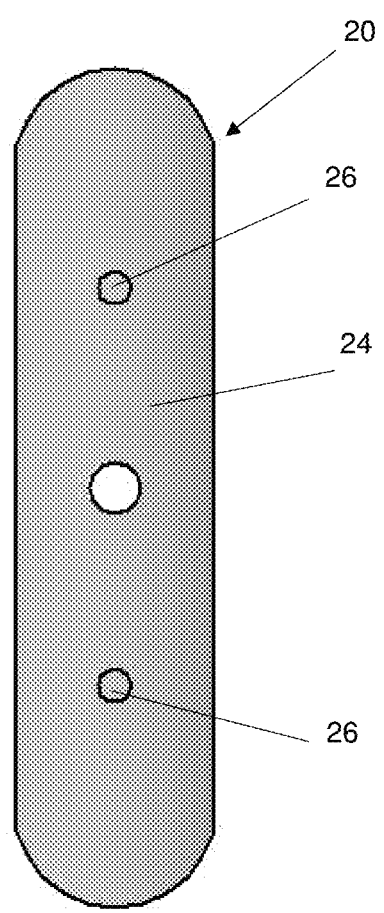

FIG. 4 shows the same detailed cross-section side view as that of FIG. 3 with the addition of shields of the present invention in place above the sensors, and FIGS. 5A-5C show an embodiment of a fitting including a shield in accordance with the present invention, in which FIG. 5A is a plan view of the fitting from the front, FIG. 5B is a perspective side view and FIG. 5C is a view of the rear of the fitting.

Figure 1:
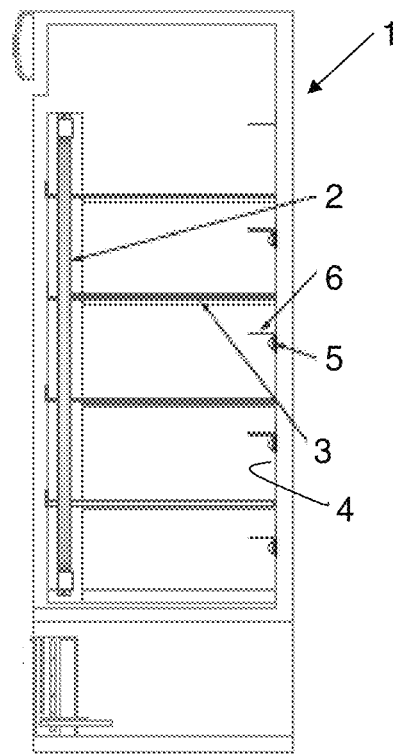
FIG. 1 is a schematic illustration from one side of a typical multi-shelf refrigerated beverage merchandising unit (RBMU) incorporating four sensors and shields in accordance with the present invention.

FIG. 1 illustrates a typical multi-shelf refrigerated beverage merchandising unit (RBMU) 1 comprising a light source 2 located at the front of the unit that illuminates a stack of four shelves 3. Affixed to the rear wall 4 of the unit are four photosensors 5, wherein each sensor is located at a height that is midway between one shelf and the shelf above. Four sensor shields 6 are attached to the rear wall 4 above each sensor 5 so that each shield 6 provides shade over each sensor 5.

Figure 2:
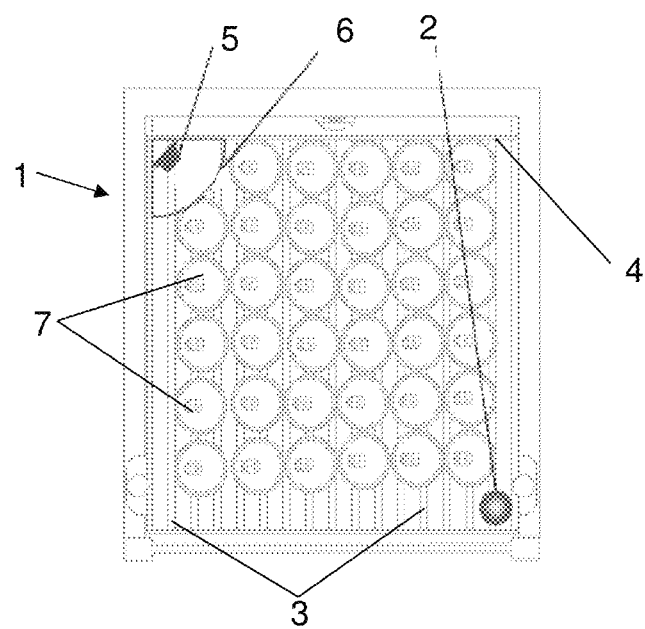
FIG. 2 shows a plan view of a single shelf from above that is fully stocked with drinks cans and illustrates a sensor shield in combination with a sensor.

FIG. 2 demonstrates an arrangement of the sensor 5 and associated shield 6 on a fully stocked shelf 3 in an RBMU 1. The shelf 3 is a slatted shelf comprising a plurality of parallel bars that run horizontally from the front of the RBMU 1 to the rear wall 4. The shelf 3 is fully stocked with drinks cans 7.

A light source 2 is located in the front right corner of the RBMU 1 and a sensor 5 is located in the opposite corner. A shield 6, illustrated in outline, having a quadrant shape is attached to the rear and side walls 4, 8 of the RBMU 1 and is located above the sensor 5. In this arrangement, the shield 6 has a radius of 2 cm.

FIG. 3 shows a detailed cross-section view of three shelves 3 to illustrate the light flow between an upper shelf 3a and a lower shelf 3b and the light detected by the sensor 5b that is associated with lower shelf 3b. Light illuminating the top shelf 3a is illustrated with cross hatchings 10 and light illuminating the lower shelf 3b is illustrated as shaded grey 12. As can be seen, light illuminating the upper shelf 3a passes through gaps in the open structure of the shelf and provides some illumination on the lower shelf 3b. The upper shelf illumination 10 is thus visible to sensor 5a associated with the upper shelf 3a, as well as sensor 5b associated with the lower shelf 3b. As demonstrated below, this "cross-contamination" of incident light coming through the upper shelf 3a will provide an inaccurate reading of the level of stock on shelf 3a if the stock level is lower than that on lower shelf 3b.

FIG. 4 shows the same detailed view as FIG. 3 but with the addition of sensor shields 6a and 6b above respective sensors 5a and 5b. Shield 6a is fixed by fixings (not shown) to the rear wall 4 of the RBMU 1 at a location directly above sensor 5a. The arrangement is replicated for the lower shelf 3b for sensor 5b and shield 6b. Dotted line 15 illustrates the line of sight from sensor 5b to the upper shelf 3a with the shield in place and shows that the upper shelf 3a is no longer "seen" by the sensor 5b. As a result, light 11 from the upper shelf 3a is also no longer seen by sensor 5b.

FIGS. 5A-5C illustrate a fitting 20 that incorporates a mount 22 for a sensor 5 and a shield 6 mounted on a back plate 24. The sensor mount 22 is shaped and sized to surround a sensor 5 that is affixed or incorporated into a wall 4 of an RMBU 1. As shown in FIG. 5A, the sensor mount 22 of the embodiment exemplified is circular in shape.

As shown in FIG. 5A, the shield 6 is semi-circular in shape, forming an arch over the sensor mount 22. The shield 6 is integrally moulded with the back plate 24 so the fitting may be manufactured by injection moulding as a single piece. It will be appreciated that the shield 6 may be made from a different material to the rest of the fitting 20 and be suitably attached to the back plate 24.

As can be seen from FIG. 5B, the back plate 24 includes projections 26 angled substantially at right angles to the plane of the back plate 24. The projections 26 are integrally moulded with the back plate 24 and enable the fitting 20 to be attached to a wall 4 of an RMBU 1. For the embodiment illustrated, the projections 26 locate in a channel, or holes, in the wall 4. It will be appreciated that other fixing means may be used, including appropriately spaces holes in the back plate to accommodate screws and the like. It will also be appreciated that the fixing may be either permanent or temporary to enable removal of the fitting 20 if and when required.

The effectiveness of the shield 6 of the present invention is demonstrated in the following example. A glass-fronted RBMU has four shelves in which Shelf A is the lowest and Shelf D is the highest. The predicted stock level on a shelf was ascertained by measuring light detected by a photosensor positioned on the opposite side of stock to light directed towards the sensor.

Table 1 shows the predicted values of stock for Shelf B based on the light detector readings for Shelf B when Shelf B has a known stock level of 50% and when stock levels on Shelf C (directly above) vary below the actual stock level on Shelf B:

TABLE 1

| Shelf C Actual stock | Shelf B Predicted stock | Variance vs. prediction |
| --- | --- | --- |
| 0% | 11% | −39% |
| 25% | 16% | −34% |
| 50% | 22% | −28% |
| 75% | 34% | −16% |
| 100% | 49% | −1% |

As can clearly be seen, as the shelf above (Shelf C) reduces in stock, more light is allowed to be transmitted to the detector of the shelf below (Shelf B) and so as the stock decreases, the light level reaching the Shelf B detector increases and the stock level prediction for Shelf B based on the light level received reduces.

Table 2 shows the same experiment when repeated with a shield as described herein above fitted over the top of the photosensor for Shelf B:

TABLE 2

| Shelf C Actual stock | Shelf B Predicted stock | Variance vs. prediction |
| --- | --- | --- |
| 0% | 45% | −5% |
| 25% | 47% | −3% |

TABLE 2-continued

| Shelf C Actual stock | Shelf B Predicted stock | Variance vs. prediction |
|---|---|---|
| 50% | 48% | −2% |
| 75% | 49% | −1% |
| 100% | 49% | −1% |

Thus, variance in predicted versus actual stock is significantly reduced and brought to within an acceptable level to provide certainty on stock levels for the body responsible for replenishing merchandise in the unit.

The invention claimed is:

1. A sensor shield in a multi-shelf merchandise display unit including a plurality of sensors mounted on a wall of the unit, in which each sensor corresponds to and is associated with a single shelf and in which the shelves are at least semi-porous to the illumination, the shield comprising:
a plate having a shape that is sufficient substantially to reduce or prevent incident illumination from a shelf above from reaching the sensor;
the plate being attachable to casing of or around the sensor or the wall of the unit and above the shelf with which the sensor is associated,
wherein the plate is opaque to the illumination detected by the sensor,
wherein the plate has a length that intersects a virtual line between the lowest point of the sensor when in situ and a point on the shelf immediately above that is furthest from the sensor to block or reduce incident or ambient light on the sensor, and
wherein the sensors are mounted on the wall of the unit opposite a source of illumination.

2. The sensor shield according to claim 1, wherein the shape or length of the plate does not significantly reduce the window through which the sensor is able to sense the illumination illuminating the shelf with which the sensor is associated.

3. The sensor shield according to claim 1, wherein the plate has a length of between about 0.5 cm and about 4 cm.

4. The sensor shield according to claim 1, wherein the plate is a substantially flat sheet.

5. The sensor shield according to claim 1, wherein the plate has a rectangular, quadrant, or semicircular shape.

6. The sensor shield according to claim 1, wherein the plate includes sides of orthogonal or other orientation to the plate, in which the sides are not opaque to the source of illumination.

7. The sensor shield according to claim 1, wherein the sensors and associated shield are positioned at a distance above the height of the shelf to enable substantial blocking of the sensor by merchandise placed on the shelf.

8. The sensor shield according to claim 1, wherein the source of illumination is selected from infra red, visible, and ultraviolet light.

9. The sensor shield according to claim 1, wherein the sensors are photosensors.

10. A method to reduce the interference of light in a multi-shelf merchandise display unit from shelves above a shelf on which stock levels are being measured, in which the unit includes
a plurality of sensors mounted on a wall of the unit, in which each sensor corresponds to and is associated with a single shelf and in which the shelves are at least semi-porous to the illumination, wherein the unit further comprises a sensor shield attached to the wall of the unit above each sensor;
wherein the shield comprising:
a plate having a shape that is sufficient substantially to reduce or prevent incident illumination from a shelf above from reaching the sensor,
the plate being attachable to casing of or around the sensor or the wall of the unit and above the shelf with which the sensor is associated,
wherein the plate is opaque to the illumination detected by the sensor,
wherein the plate has a length that intersects a virtual line between the lowest point of the sensor when in situ and a point on the shelf immediately above that is furthest from the sensor to block or reduce incident or ambient light on the sensor, and wherein the sensors are mounted on the wall of the unit opposite a source of illumination.

11. A method in a multi-shelf merchandise display unit, the method comprising
measuring a level of illumination entering or originating from within the unit, wherein the level of illumination is measured by a plurality of sensors positioned on an opposite side of stock placed in the unit to a source of illumination, and
wherein a sensor shield is attached above each sensor; in which each sensor corresponds to and is associated with a single shelf and in which the shelves are at least semi-porous to the illumination, the shield comprising:
a plate having a shape that is sufficient substantially to reduce or prevent incident illumination from a shelf above from reaching the sensor,
the plate being attachable to casing of or around the sensor or the wall of the unit and above the shelf with which the sensor is associated,
wherein the plate is opaque to the illumination detected by the sensor,
wherein the plate has a length that intersects a virtual line between the lowest point of the sensor when in situ and a point on the shelf immediately above that is furthest from the sensor to block or reduce incident or ambient light on the sensor, and wherein the sensors are mounted on the wall of the unit opposite a source of illumination.

12. The sensor shield according to claim 1, wherein the plurality of sensors are connected to a measuring device that triggers an alert when the stock level reaches a predetermined low level or zero because illumination reaching the one or more sensors has exceeded a preset value.

13. The sensor shield according to claim 12, wherein the alert is a visual alert, an aural alert, or an electronic alert to a remote microprocessor.

14. The sensor shield according to claim 13, wherein the electronic alert to a microprocessor informs a retailer that stock is low or missing, or instructs a supplier to provide more product.

15. The method according to claim 10, wherein the method further comprises calibration steps in which levels of illumination are measured with the unit in a filled and empty state.

16. The method according to claim 10, wherein the method further comprises recording time data.

17. The method according to claim 16, wherein the time data is by shelf in the unit.

18. The sensor shield of claim 1 wherein the wall on which the sensors are mounted is a rear wall of the unit and wherein the source of illumination is located at the front of the unit.

19. A sensor shield in a multi-shelf merchandise display unit including a plurality of sensors mounted on a wall of the unit in which each sensor corresponds to and is associated with a single shelf of said display unit and in which the shelves are at least semi-porous to the illumination, the shield comprising:

- a plate having a length or shape that is sufficient substantially to reduce or prevent incident illumination from a shelf above from reaching the sensor associated with the shield, the plate being attachable to casing of or around the sensor or the wall of the unit,
- wherein the plate is opaque to the illumination detected by the sensor,
- wherein the plate has a length that intersects a virtual line between the lowest point of the sensor when in situ and a point on a shelf immediately above that is furthest from the sensor to block or reduce incident or ambient light on the sensor,
- wherein the plate has a quadrant or semicircular shape, and
- wherein the sensors are mounted on the wall of the unit opposite a source of illumination and wherein the source of illumination is on an opposite side of said display unit to said sensors.

* * * * *